July 14, 1942.  W. H. LONGSTREET  2,290,106
VULCANIZER
Filed Feb. 24, 1940  2 Sheets-Sheet 1
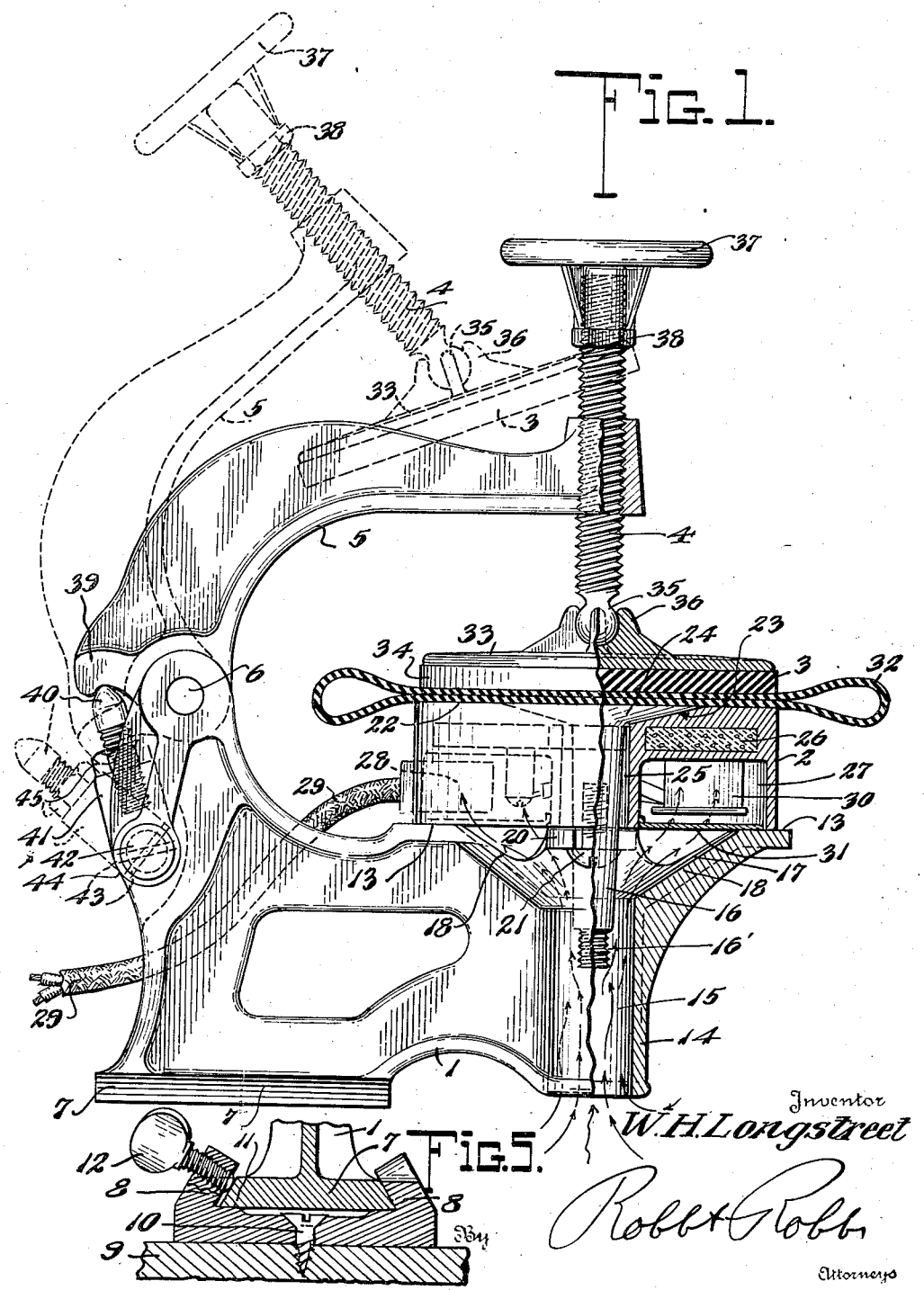

July 14, 1942. W. H. LONGSTREET 2,290,106
VULCANIZER
Filed Feb. 24, 1940 2 Sheets-Sheet 2
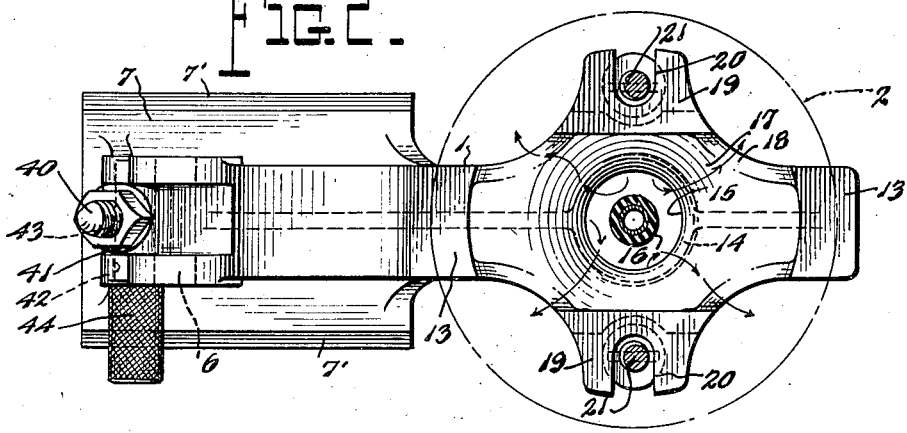
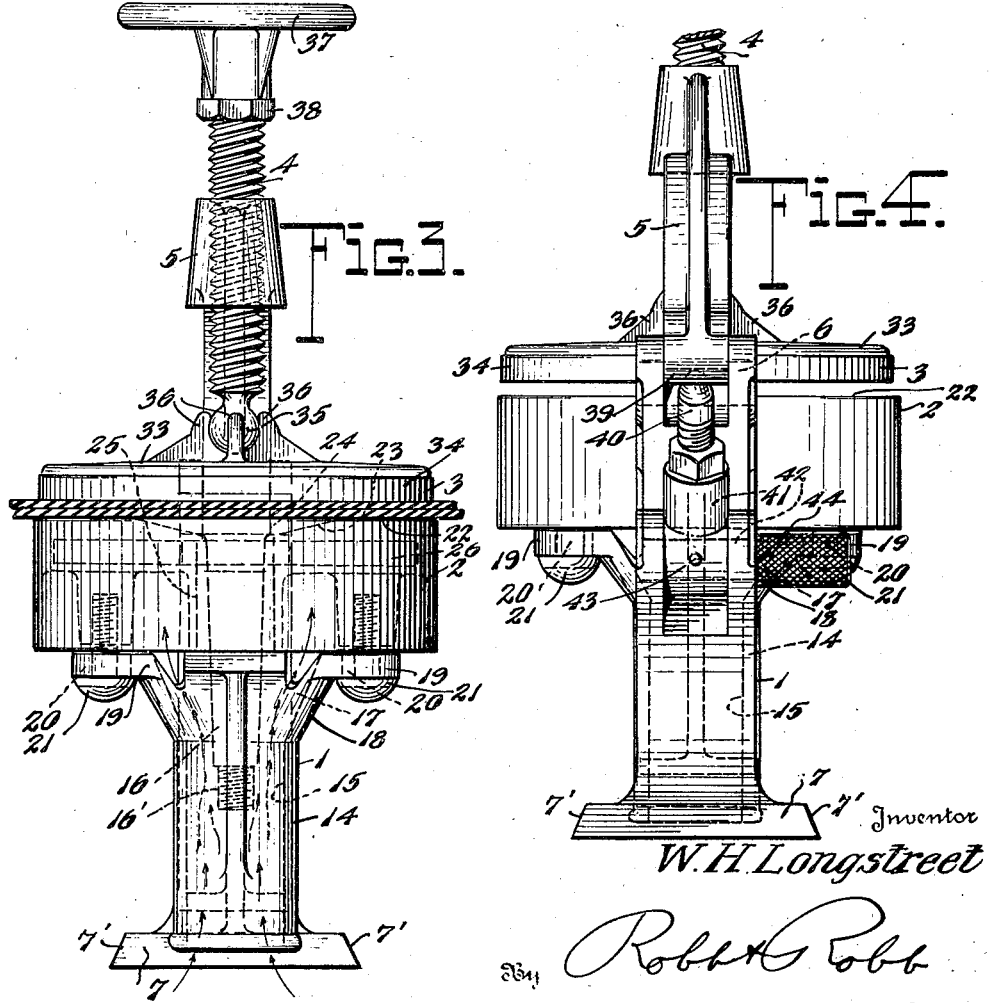
Inventor
W. H. Longstreet
By Robt G Robb
Attorneys Patented July 14, 1942

2,290,106

UNITED STATES PATENT OFFICE 2,290,106

VULCANIZER

Walter H. Longstreet, Brooklyn, N. Y., assignor to Acme Air Appliance Company, Inc., Brooklyn, N. Y., a corporation of New York Application February 24, 1940, Serial No. 320,648

12 Claims. (Cl. 18—18)

This invention relates to vulcanizers, and more especially to vulcanizers primarily adapted for use in vulcanizing rubber valve stems to inner tubes of pneumatic tires and the like.

In recent years, rubber valve stems have gone into such extensive use that at the present time their use has become practically exclusive and the former metal valve stems are more or less obsolete. The attachment of the rubber valve stems to the inner tube is usually attained by vulcanization in order to secure an effective seal between the base of the stem and the inner tube, but as with tires and inner tubes in general, it sometimes becomes necessary to repair or replace the valve stem as a result of damage or deterioration of the rubber. Rubber valve stems are now readily obtainable on the market, particularly in accessory stores and in service shops and in filling stations where tire repair services are maintained. Usually each new valve stem is sold complete with the valve insides mounted therein and a dust cap or cover on the end of the same which encloses the valve insides. Since quick service is essential in establishments engaged in tire and tube repair service, the attendant, most often through oversight or otherwise, usually applies the new valve stem to the inner tube without removing the valve insides and sometimes even the dust cap, such application being made by means of a vulcanizer of a type especially designed to vulcanize valve stems. Where this occurs, there is a tendency for the heat of vulcanization to injure the valve insides as by softening, deforming or otherwise damaging the small rubber seal or seat which forms a part of the valve insides. This is due to the fact that the rubber valve stem is usually provided with a tubular metal core projecting a substantial distance through the stem and in which the valve insides are disposed, the outer end of the core projecting beyond the corresponding end of the rubber stem for threadedly receiving the dust cap or closure above referred to. Being made of metal, the core quickly absorbs the heat during the vulcanization and will retain the heat for a substantial length of time unless some provision is made for dissipating this heat which may reach as high as 300° F. or thereabouts in the use of modern day electric vulcanizers.

Having the foregoing conditions in mind, one of the primary objects of the present invention is to provide an improved vulcanizer which is so constructed and arranged that the vulcanizing heat is substantially confined to the zone at the base of the valve stem where the valve stem is to be attached to the inner tube, while at the same time maintaining the outer end of the valve stem, and preferably a substantial length of the valve stem, relatively cool during the vulcanizing operation.

To the above end my improved vulcanizer generally includes a base on which a heating unit of a suitable type, preferably electrically operated, is mounted in such a manner that the conduction of heat from the heater unit to the base is reduced to a minimum. The heater unit and base are each provided with a central opening in register with each other so as to receive the valve stem in an inverted position, that is, with the outer end of the valve stem in which the valve insides are normally located, disposed below the base of the valve stem, and the base of the valve stem resting upon the upper vulcanizing surface of the heater unit aforesaid. As usual in vulcanizers of this general type, a pressure platen is adjustably mounted above the heater unit so that the inner tube may be clamped firmly against the base of the valve stem when the latter is in position for carrying out the vulcanizing operation, and this invention also contemplates certain improvements in the mounting and adjusting instrumentalities associated with the pressure platen, as will hereinafter become more fully apparent.

To attain the important stem cooling feature which characterizes this invention, the base of the vulcanizer is constructed so that it has a substantial depth or thickness, making the combined thickness or depth of the base and heating unit at least equal to or somewhat greater than the length of the longest valve stem normally used in the trade. Correspondingly the opening through the base and into which the valve stem projects when in vulcanizing position, is of substantial length, and this opening in the base is preferably enlarged at its upper end and leads laterally outwardly at the sides of the base below the heater unit. By reason of such a construction, the opening in the base constitutes a "chimney," causing cold air to enter the lower end of the opening and then rise upwardly about the valve stem to the upper end of the opening where it is discharged laterally outwardly from the base below the heater unit. A continuous circulation of cool air is maintained by the "chimney" effect just described, and it is to be particularly noted that the coldest air is always initially directed into contact with the outer (lower) end of the valve stem where the greatest cooling effect is most desirable, and before the air has had time enough to be heated to any material extent by the heat radiated from the heater unit. Since heated air tends to rise, the heat developed by the heater unit cannot flow in a downward direction below the heater unit for any substantial distance; hence the heat is confined to the zone of the base of the valve stem where the highest temperature is desired to produce the vulcanization, and the opposite end of the valve stem is always maintained cool by virtue of a strong circulation of only cold or relatively cool air about the same and towards the base of the stem. This feature of my invention is, I believe, a material departure from and improvement over the prior practices in the vulcanizer art.

A further important object of my invention is to provide an improved mounting for the pressure platen of the vulcanizer assembly, said mounting being of such a character that the pressure platen may be quickly moved to an out-of-the-way position, thus eliminating the laborious and time-taking operation of the usual pressure screw, which in my vulcanizer is relied on only to obtain the final pressure adjustment and initial release thereof.

More specifically stated, my improved mounting for the pressure platen comprises a platen support pivotally connected to the base of the vulcanizer assembly and having an abutment located at the side of the pivotal connection opposite to the platen, but relatively close to the pivotal axis of the support, together with a movable abutment member carried by the base and operatively engageable with and shiftable away from the abutment on the pivotal platen support.

Other and further objects and advantages of the invention will be hereinafter described and the novel features thereof defined by the appended claims.

In the drawings:

Figure 1 is a view of a vulcanizer constructed in accordance with my invention, the vulcanizer being shown partly in side elevation and partly in vertical section, with a rubber valve stem and inner tube disposed therein for the performance of a typical vulcanizing operation, and also showing in broken lines the pressure platen support and associated parts in their released position;

Figure 2 is a top plan view of the vulcanizer base, the outline of the heater unit being shown in broken lines in the relation which this unit occupies when mounted on the base;

Figure 3 is a view of the vulcanizer assembly in front elevation with the parts in the positions assumed during the vulcanization of a rubber valve stem to an inner tube, the valve stem being shown in dotted lines.

Figure 4 is a view generally similar to Figure 3, but looking towards the rear of the vulcanizer;

Figure 5 is a fragmentary vertical sectional view taken through the base of the vulcanizer and showing the preferred manner of removably attaching the base to a work bench or other supporting surface.

Like reference characters designate corresponding parts in the several figures of the drawings, wherein I generally denotes the base of the vulcanizer, 2 the heater unit, 3 the pressure platen, 4 the pressure screw, and 5 the pressure platen support which is pivotally connected to the base I at 6. Most of these parts may be formed as simple metal castings, suitably reinforced by lateral ribs to strengthen the same. The base I is preferably so constructed that it may be conveniently mounted upon a work bench, table, or other supporting surface, and to this end, I have illustrated in Figure 5 a simple and practical detachable mounting in which 7 represents a flat pad on the base I having its lateral edges inclined as at 7', 7' to give it a more or less dovetailed shape in transverse cross section. This pad 7 is adapted to be slidingly received in a bracket 8 which is fastened to the work bench or table 9 by any suitable fastenings such as one or more screws 10. The bracket 8 is provided with a dovetailed channel 11 generally corresponding to the shape of the pad 7 and the walls of the channel 11 preferably converge towards one end of the bracket so as to enable the pad 7 to be wedged therein with a tight fit when it is slid into the bracket 8 from one end of the latter. A thumb screw 12 or other equivalent locking device may also be provided if desired to releasably secure the pad 7 in the bracket 8 as will be obvious in Figure 5.

Referring now particularly to Figures 1 to 4 inclusive, it will be seen that the base I is considerably narrower in width than the heater unit 2, the latter preferably having a generally circular form as shown in Figure 2, and being of relatively shallow depth. The primary reason for this relationship just referred to is to provide widely spaced supporting surfaces 13, 13 at the upper side of the base I on which the heater unit rests, with contact between the heater unit and base at correspondingly widely spaced points. This has the distinct advantage of reducing the heat conduction from the heater unit to the base to a minimum, and at the same time leaves the space below the overhanging sides of the heater unit at opposite sides of the base, relatively unobstructed.

At the forward end of the base I and intermediate the supporting surfaces 13, 13, the base is enlarged into a generally tubular form, as indicated at 14, providing a vertical axially elongated opening 15 through the base from top to bottom. The size of the opening 15 is proportioned so that it is substantially larger than the size of the valve stem which is designated 16 in the drawings. The upper end of the opening 15 terminates in a recess of upwardly and outwardly diverging form, as indicated at 17, the opposite sides 18, 18 of the recess merging into the supporting surfaces 13, 13.

Extending laterally at opposite sides of the base I, intermediate the supporting surfaces 13, 13, is a pair of lugs 19, 19. the outer extremities of which are bifurcated or otherwise provided with openings 20 to receive a fastening instrumentality such as a screw 21 to detachably connect the heater unit 2 to the base, with the bottom of the heater unit resting upon the supporting surfaces 13, 13, but preferably spaced slightly from the lugs 19.

The heater unit may be of any suitable construction, but preferably comprises an inverted cup-shaped housing, the upper side of which constitutes the vulcanizing surface, as designated 22. The central portion of the upper vulcanizing surface 22 is preferably somewhat depressed as at 23 to fit the base 24 of the rubber valve stem 16 which is of conventional form. As previously indicated, the heating unit 2 is provided with a central opening 25, which is also of a size somewhat larger than the valve stem 16, and this opening 25 registers with opening 15 in the base 1 when the heater unit 2 is mounted on the base by means of the fastenings 21.

Mounted in the heater shell or housing is an electrical heating element of any suitable form, this heating element being designated 26 and being shown as a relatively thin annular element extending about the central opening 25 in the heater shell and disposed relatively close to the vulcanizing surface 22 at the upper side of the shell. I have found that in actual practice, a very efficient and economical heater assembly may be produced by die-casting the heater shell or housing, with the heating element 26 completely imbedded within and enclosed by the upper wall of the shell, and leaving an annular space 27 therebelow. Within this annular space may be mounted a terminal block 28 to which the extension cord 29 leads for connecting the heating element 26 to any convenient outlet. Also disposed within the space 27 is a thermostatic control element generally designated 30, the details of which have not been shown since they are immaterial to the present invention. It will be understood, however, that the electrical circuit includes a conductor leading from the terminal block 28 to one end of the heating element 26, and that the thermostatic control element 30 is interposed in a connection leading from the other end of the heating element 26 back to the terminal block 28. After the heater assembly has been made as just described, the lower side of the annular space 27 is preferably closed by a cover plate 31 which aids in confining the heat to the zone of the heating element 26, and reduces direct radiation of heat in a downward direction.

When the valve stem 16, with or without the valve insides (not shown) mounted therein, and with or without the dust cap (also not shown) mounted thereon, is disposed in vulcanizing position, with the base 24 of the valve stem seated on the upper side of the vulcanizing surface 22, and its outer or stem portion depending below the vulcanizing surface and disposed within the openings 25 and 15 in the heater unit 2 and base 1, respectively, air is permitted to freely circulate in a generally upward direction around the lower end of the valve stem and for a substantial length of that portion of the valve stem in which the metal core is disposed, the core being designated as 16'. The walls of the opening 15 form what may be said to be a chimney, and produce a strong upward circulation of air through the opening 15 by a chimney effect. The circulation of the air is aided by the natural tendency of heated air to rise. In the construction which I have just described, the air will be heated to some extent at least in the recess 17 in the base 1, immediately below the heater unit 2, but this air will not flow downwardly for any appreciable distance, but on the contrary will tend to flow laterally outwardly from the recess 17, and thence generally upwardly about the sides of heater unit 2, with the heat being ultimately dissipated into the atmosphere. The rising warm air induces the cold, or relatively cool, air to enter the lower end of the opening or chimney 15, and the circulation will assume the generally upward path as indicated by the arrows in Figure 1 of the drawings. Thus it will be seen that the cold, or relatively cool, air is first brought into contact with the lower end of the valve stem 16 where the greatest cooling effect is desired, and before the air has been appreciably heated by contact with and conduction of the heat through the parts of the vulcanizer nearest the heater unit.

In order to assure firm contact of the base 24 of the valve stem 16 with the part to which it is to be vulcanized, such as the inner tube generally designated 32, and thus insure a perfect vulcanized seal between the parts, I provide as usual the pressure platen 3 which may be clamped against the upper side of the inner tube 32, or other work piece as the case may be. The platen preferably includes a flat plate 33 of the approximate size of the heater unit 2, with the lower side of the plate 33 faced with a resilient pad or cushion 34 to enable it to conform to any irregularities in the work. The platen 3 is connected, preferably by means of a universal joint to the lower end of an adjusting screw 4. A simple form of such connection is shown in the drawings as a ball or spherical part 35 formed on the lower end of the screw 4 and received in a socket formed by the upwardly extended radial webs 36 arranged on the upper side of the plate 33. The screw 4 is threaded in the forward extremity of the platen supporting arm 5 which extends over the central part of the heater unit 2, and the upper end of the screw has fixed thereto a handwheel 37 or other appropriate form of handle by means of which the screw 4 may be screwed upwardly and downwardly at will to move the platen 3 away from or towards the vulcanizing surface 22 of the heater unit 2. 38 designates a lock nut to prevent loosening of the handwheel 37 which may be screwed onto the upper end of the screw 4.

It has already been mentioned that the platen supporting arm 5 is preferably pivotally attached to the base 1 as at 6, the part 6 constituting a pintle or hinge pin. By reason of this pivotal connection, the supporting arm 5, together with the pressure screw 4 and platen 3 may be swung in a generally upward and downward direction, as for instance from the full line position shown in Figure 1 to the dotted line position also shown in this figure. In the latter position, the platen is moved out of the way so that the valve stem 16 and inner tube 32 may be conveniently placed in vulcanizing position preparatory to commencing the vulcanizing operation and removed from the vulcanizer after the vulcanizing operation has been completed. In order to enable the platen 3 to be pressed or clamped against the work, some provision must be made to prevent the supporting arm 5 from moving in a counter-clockwise direction about the axis of the pivot 6 (as seen in Figure 1) when the pressure screw 4 is screwed in the pressure applying direction. For this purpose, the arm 5 is provided with an abutment lug or offset 39 near the pivotal axis of the arm and at the side of the pivotal axis opposite to the platen 3. A cooperating abutment member generally designated 40 is provided on the base 1 to engage beneath the abutment 39, and thus prevent any pivotal movement of the arm 5 in a counter-clockwise direction while the abutting engagement of these parts is maintained. The abutment member 40 is preferably shiftable from the cooperative abutting position shown in full lines in Figure 1, to an inoperative or disengaged position as shown in dotted lines in this same figures. For this purpose, the abutment 40 preferably includes a part 41 which is pivotally attached to the base 1 by means of a pin 42 journalled for rotation in the base, the pin 42 being suitably fixed to the part 41 as by means of a key or locking pin 43. For convenience of manipulation of the part 41, the pin 42 is preferably extended to one side of the part 41 at one side of the base 1, and terminates in the form of a knob or handle as indicated at 44. The abutment 40 may be attached to the part 41 in any suitable manner, but preferably in such manner that the free end of the abutment 40 may be adjusted towards and away from the axis of the pin 42. As one simple form of adjustment, the abutment 40 may be threaded into the part 41 and secured in adjusted position by a lock nut 45. This adjustment enables the restrained position of the platen supporting arm 5 to be varied at will, thus allowing the arm to be moved away from the vulcanizing surface of the heater unit to a greater or less extent than that represented by the full lines in Figure 1, before applying pressure to the platen.

It will be understood from the foregoing that the adjustment of the pressure screw is necessary only to secure the final pressure adjustment of the platen against the work, and the usual release of such pressure preliminary to actuating the abutment 40 to its inoperative position in which it is disengaged from the abutment 39 to allow the arm 5 to be moved so as to bring the platen to an out-of-the-way position. The pressure screw 4 is preferably provided with a double lead thread, as shown in the drawings, although this is not essential to my invention. However, with such a thread, the time required to effect the final pressure adjustment and initial release thereof is reduced to a minimum, while at the same time it prevents the application of too great a pressure on the platen, or such great pressure as might unduly strain or break the supporting arm 5 or its connection to the base 1.

By reason of the improved frame construction of my vulcanizer, as hereinbefore described, and especially the provision of the cooperating abutments 39 and 40 at the back of the arm 5 and base 1 respectively, the frame is always open and unobstructed at the front so that it readily permits repair of large work pieces, such as large inner tubes for truck and bus tires. These large tubes could be repaired, if at all, only with great difficulty because of the limited space and presence of obstructing parts of the frame in some of the prior vulcanizers.

In addition to vulcanizing rubber valve stems, my vulcanizer is also adapted for use to vulcanize flat patches. For this purpose, a flat plate is placed upon the vulcanizing surface 22 at the upper side of the heater unit 2, the plate preferably having a stem depending from the lower side thereof for reception loosely in the openings 25 and 15 to prevent accidental displacement of the plate. Since this feature will be obvious to those skilled in the art and its use is optional, it has not been illustrated in the drawings.

While the specific details of construction have been herein shown and described the invention is not confined thereto as changes and alterations may be made without departing from the spirit thereof as defined by the appended claims.

Having thus described my invention, what I claim as new and desire to secure by Letters Patent is:

1. A vulcanizer of the class described, comprising a base, a heater mounted on the base and having a vulcanizing surface, a pressure platen operatively related to the vulcanizing surface for clamping the work against the base of a valve stem which is to be vulcanized to the work, and said heater and vulcanizer base having registering openings therein to receive the valve stem, with the opening in the vulcanizer base in free communication with the atmosphere at a point between the lower end of the opening and said heater as well as at a point in the general zone of the lower end of the opening, to thereby provide a continuous circulation of relatively cool air through the opening in the vulcanizer base and at least about the free end of the valve stem.

2. A vulcanizer of the class described, comprising a heater having a vulcanizing surface provided with an opening to receive a valve stem with its base disposed on the vulcanizing surface and with the opposite end of the valve stem depending below the vulcanizing surface, a pressure platen operatively related to the vulcanizing surface for clamping the work against the base of the valve stem which is to be vulcanized to the work, and means below the vulcanizing surface forming an axially elongated chimney about the depending end of the valve stem and spaced therefrom, said chimney forming means being axially open to atmosphere in a downward direction to receive relatively cool air, and also having an air outlet disposed at the opposite end thereof.

3. Apparatus as claimed in claim 1, wherein the vulcanizer base includes a plurality of spaced supports for the heater extending generally radially outward with respect to the axis of the valve stem receiving opening in the base, said spaced supports having upwardly diverging intermediate walls forming therebetween an enlarged chamber and intermediate outlets for the circulating air.

4. Apparatus as claimed in claim 2, wherein the chimney includes an enlarged chamber at its upper end across which the heater is arranged to substantially close the same in an upward direction, and the air outlet of the chimney opening generally laterally outward of the chamber below the heater.

5. A vulcanizer of the class described, comprising a heater of generally annular form having a vulcanizing surface at its upper side and a valve stem receiving opening extending axially therethrough, a base for supporting said heater, said base being elongated and substantially narrower in width than the diameter of the heater and formed with longitudinally spaced heater supporting surfaces of relatively small area for supporting contact with the heater at widely spaced points longitudinally of the base, said base also having an enlarged recess between and below said supporting surfaces, and a valve stem receiving opening extending from said recess through the bottom of the base in axial alignment with the valve stem receiving opening in the heater so that the valve stem will project into the opening through the base when it is disposed in vulcanizing position in the vulcanizer, and a pressure platen operatively associated with the vulcanizing surface of the heater.

6. Apparatus as claimed in claim 5, wherein the base of the vulcanizer extends diametrically across the bottom of the heater, and contacts the latter at diametrically opposite points only.

7. Apparatus as claimed in claim 5, wherein the base of the vulcanizer is provided with a plurality of spaced lugs extending laterally therefrom between the heater supporting surfaces of the base and in spaced relation to the same, in combination with fastening means for connecting the heater to the lugs aforesaid.

8. Apparatus as claimed in claim 5, wherein the base of the vulcanizer is provided with a plurality of spaced lugs extending laterally therefrom between the heater supporting surfaces of the base and in spaced relation to the same, in combination with detachable fastening means extending through the lugs aforesaid and into the heater for removably securing the heater to the base.

9. A vulcanizer of the class described, comprising a base, a heater mounted on the base and having a vulcanizing surface, a pressure platen operatively associated with the vulcanizing surface of the heater, a platen support movably connected to the base so that the platen may be moved towards and away from the vulcanizing surface aforesaid, and separate adjustable means on one of the platen support and vulcanizer base elements movable to abut the other element adjacent to the connection therebetween and restrain the platen support against movement in the direction of its movement away from the vulcanizing surface during the application of pressure by the pressure platen.

10. A vulcanizer of the class described, comprising a base, a heater mounted on the base and having a vulcanizing surface, a pressure platen operatively associated with the vulcanizing surface of the heater, a platen support pivotally connected to the base so that the platen may be swung towards and away from the vulcanizing surface aforesaid, and means on one of the platen support and vulcanizer base elements for abutting the other element adjacent to the pivotal connection therebetween for restraining the platen support against movement in one direction during the application of pressure by the pressure platen.

11. A vulcanizer of the class described, comprising a base, a heater mounted on the base and having a vulcanizing surface, a pressure platen operatively associated with the vulcanizing surface of the heater, a platen support pivotally connected to the base in overhanging relation to the vulcanizing surface aforesaid, with the platen disposed at one side of the pivotal axis of the platen support for movement towards and away from the vulcanizing surface, and cooperating abutment means on the platen support and vulcanizer base respectively and arranged at the side of the pivotal axis of the platen support opposite to the platen, for restraining the platen support and platen against movement away from the vulcanizing surface during pressure application of the pressure platen, one of the said abutment means being shiftable to an inoperative position.

12. Apparatus as claimed in claim 11, wherein one of the abutment means is adjustably extensible.

WALTER H. LONGSTREET.